United States Patent [19]

Schad

[11] Patent Number: 4,682,945
[45] Date of Patent: Jul. 28, 1987

[54] THERMAL INSULATING AND EXPANSION ASSEMBLY FOR INJECTION MOLDING MACHINE

[75] Inventor: Robert D. Schad, Toronto, Canada

[73] Assignee: Husky Injection Molding Systems Ltd., Bolton, Canada

[21] Appl. No.: 783,580

[22] Filed: Oct. 3, 1985

Related U.S. Application Data

[63] Continuation-in-part of Ser. No. 630,970, Jul. 16, 1984, Pat. No. 4,588,367.

[51] Int. Cl.⁴ .............................................. B29F 1/03
[52] U.S. Cl. .................................... 425/549; 425/564; 425/570; 425/572; 425/588

[58] Field of Search ............... 425/547, 549, 572, 548, 425/566, 562, 564, 570, 571, 588, DIG. 227, DIG. 224

[56] References Cited

U.S. PATENT DOCUMENTS

| 3,530,539 | 9/1970 | Gellert | 425/562 |
| 4,268,240 | 5/1981 | Rees et al. | 425/548 |
| 4,279,582 | 7/1981 | Osuna-Diaz | 425/566 |
| 4,501,550 | 2/1985 | Nikkuni | 425/566 |

Primary Examiner—Jay H. Woo
Assistant Examiner—James C. Housel
Attorney, Agent, or Firm—Bachman & LaPointe

[57] ABSTRACT

A telescoped assembly of sleeves for supporting, sealing and insulating a floating manifold between mold plates or other abutments in an injection molding machine.

10 Claims, 3 Drawing Figures

THERMAL INSULATING AND EXPANSION ASSEMBLY FOR INJECTION MOLDING MACHINE

CROSS-REFERENCE TO RELATED APPLICATIONS

This application is a continuation-in-part of co-pending application Ser. No. 630,970, Filed July 16, 1984 now U.S. Pat. No. 4,588,367 by Robert D. Schad.

FIELD OF THE INVENTION

The present invention relates to injection molding machines and in particular relates to structure for supporting, sealing and thermally insulating so-called floating manifolds disposed between mold plates or other abutments.

BACKGROUND OF THE INVENTION

As disclosed in said co-pending application it is desirable to seal the relatively hot manifold tightly against the adjacent mold plates which supports the nozzle housing while blocking the transfer of heat from the manifold to mold plates for well known reasons.

In the co-pending application the structure for sealing the manifold and maintaining thermal insulation are the cup-shaped expansion elements 12 and 13.

A further example of prior art expansion elements are disclosed in U.S. Pat. No. 4,268,240 in that a cup-shaped element 20 (termed a cylinder) abuts one side of a floating manifold 22 and is bottomed in a cover plate or back plate 10.

A second expansion element 24 (termed a nozzle) abuts the opposite side of the manifold and includes nozzle housing leading to mold plates 12 and 13.

While these prior art thermal expansion arrangements are operable there is constant activity to increase the integrity of the seal, improve thermal insulation, and extend the stroke or deflection of the expansion elements while minimizing the number of critical dimensions that must be met in fabricating the various piece parts.

SUMMARY OF THE INVENTION

Therefore it is a principal object of the present invention to provide a new and improved thermal expansion assembly for supporting and sealing a floating manifold in an injection molding machine.

A further feature of the invention is the provision of a novel method of supporting, sealing and insulating a floating manifold.

A still further feature of the invention is the provision of a thermal expansion assembly which is constructed and arranged so as to minimize the number of critical close tolerance dimensions that must be met in fabricating the assembly.

A thermal expansion assembly embracing structural features of the present invention useful to stress a floating mandrel disposed between two spaced plates or abutments effective to seal, support and insulate thermally the manifold may comprise a set of relatively movable, cooperating support members or an assembly of thermal expansion elements in physical contact with said manifold and one of said abutments, whereby thermal expansion of said support members generates relative motion between said members effective to clamp the mandrel between said abutments to seal and insulate the manifold against said abutments.

A method of supporting, sealing and thermally insulating a floating mandrel between two abutments in accordance with other features of the invention may comprise the steps of forming a well in one of said abutments, providing a pair of metallic sleeves, forming opposed inwardly and outwardly projecting flanges on a first sleeve, disposing said first sleeve in said well so that outwardly projecting flange engages said one abutment and disposing the second sleeves inside the first sleeve in telescopic fashion so that one end of the second sleeve bottoms on said inwardly projecting flange and the other end thereof contacts said manifold.

BRIEF DESCRIPTION OF THE DRAWINGS

Other features and advantages of the present invention will become more apparent from an examination of the succeeding specification when read in conjunction with the appended drawings in which.

DESCRIPTION OF PREFERRED EMBODIMENT

Figure 1:
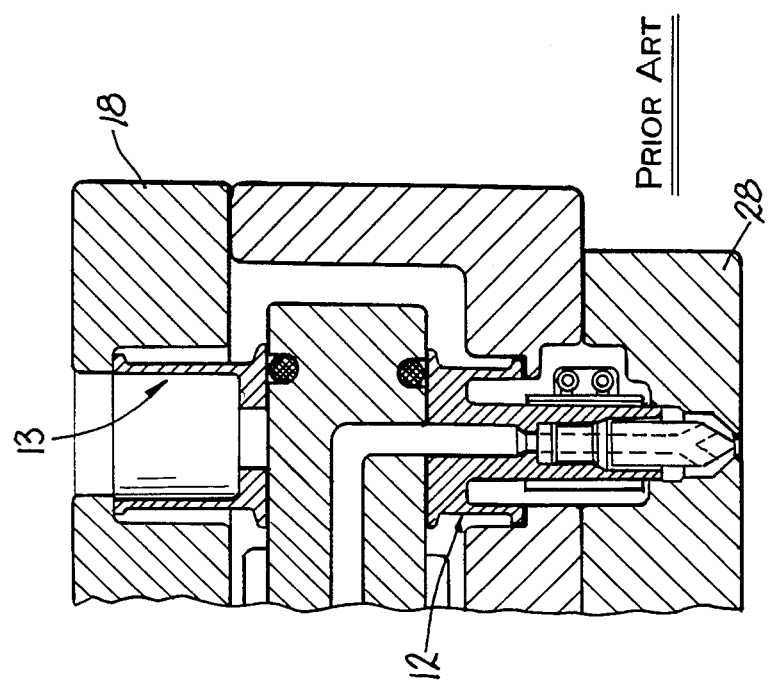
FIG. 1 is a sectional view of a portion of an injection molding machine showing prior art thermal expansion units straddling a floating manifold.

Referring now in detail to the drawings note that the prior art expansion elements 12 and 13 of FIG. 1 are single element cups which expand thermally along a common axis to clamp a floating manifold between mold plates or abutments 18 and 28.

Figure 3:
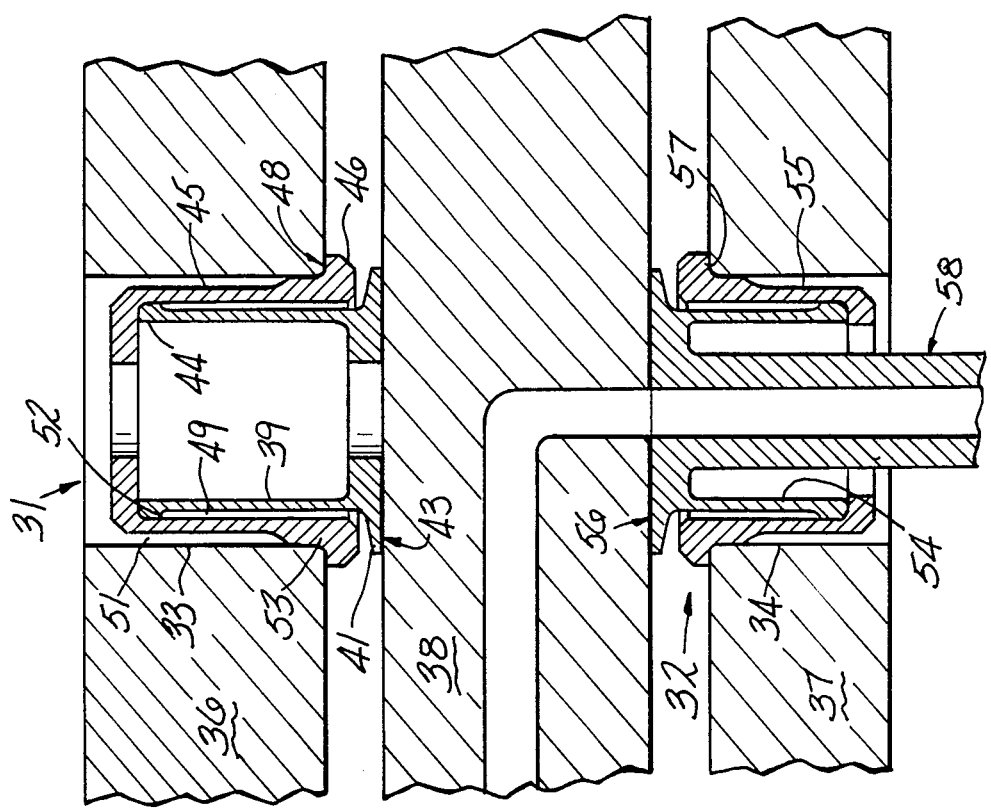
FIG. 3 is a simplified schematic sketch showing the invention with greater clarity.
Figure 2:
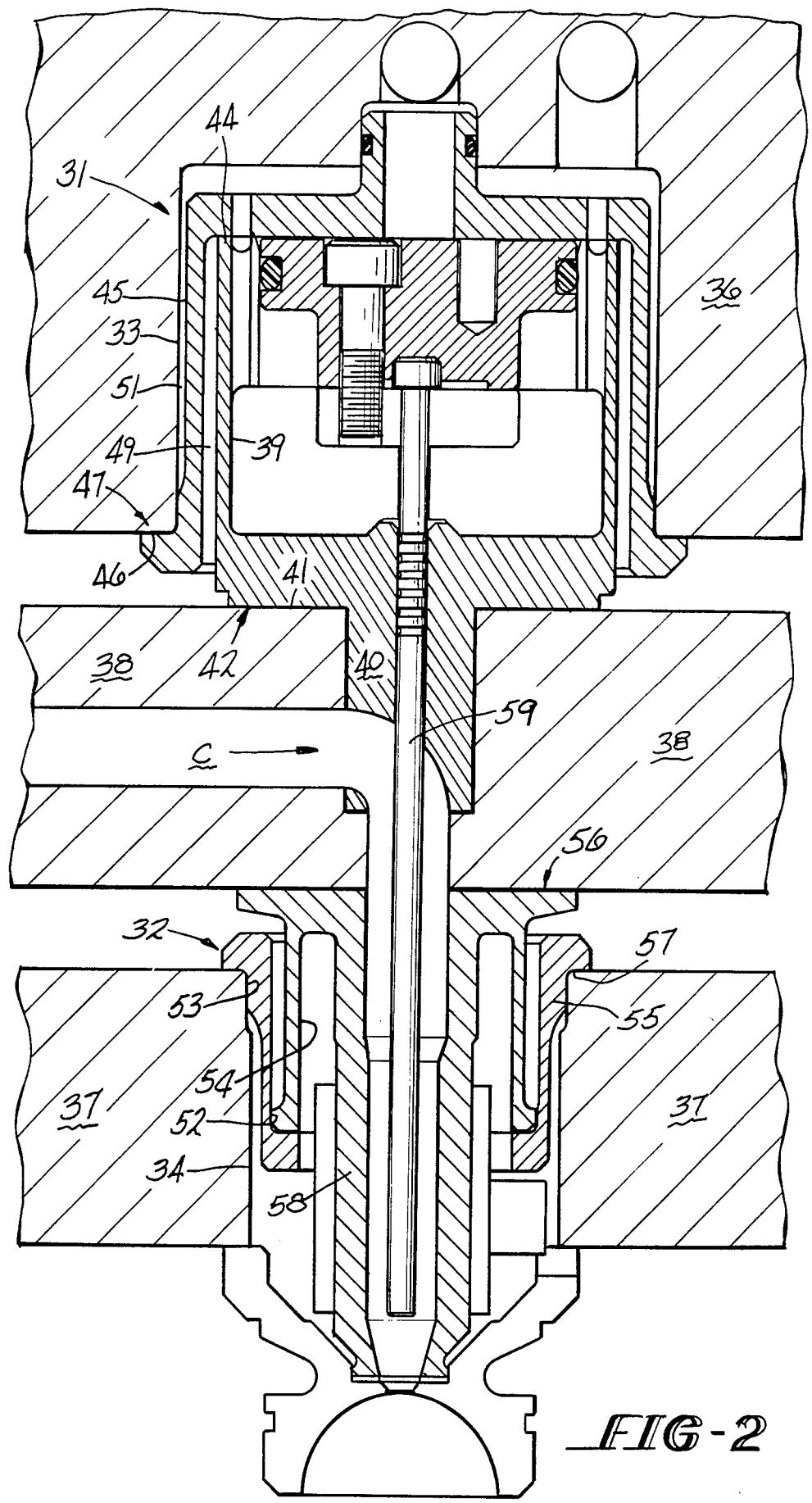
FIG. 2 is a sectional view of a portion of an injection molding machine illustrating an embodiment of the thermal expansion assembly of the present invention in combination with a double acting air operated valve gate.

In contrast FIGS. 2 and 3 show thermal expansion assemblies indicated generally at 31 and 32 where each assembly is received in mating wells 33 and 34 found in mold plates or mold abutments 36 and 37 respectively straddling a floating manifold 38.

Each assembly 31–32 includes a set of relatively movable support members in physical contact with a mating abutment and one side of the floating manifold.

For example, assembly 31 includes an inner tubular element 39 formed with a peripheral flange or bearing surface 41 in contact with one side of the floating manifold 38 as at 42 in FIG. 2 and at 43 in FIG. 3.

The opposite end 44 of the tubular element 39 bottoms in telescopic fashion in an outer cup-shaped element 45 having a peripheral contact with mold plate 36 at 47 in FIG. 2 and at 48 in FIG. 3.

The telescoping elements 39 and 45 are undercut or otherwise dimensioned so that insulating annular air spaces 49 and 51 are created.

In order to maintain alignment of the expansion assemblies as they move relative to one another during thermal expansion it is desirable to provide raised lands or bearing surfaces 52 and 53 as shown in FIGS. 2 and 3.

Note that the inner tubular 39 element of FIG. 2 is formed with a contiguous boss 40 forming a housing for guiding reciprocating gate valve rod 54 and for sealing the rod from the molding compound flowing through the manifold as disclosed and described in the aforesaid '240 patent.

The support assembly 32 (lower assembly of FIGS. 2 and 3), having the same basic telescopic structure and operation of the top assembly 31, is inverted in that the inner tubular element 54 abuts the floating manifold 38 at 56 and the outer cup-shaped element 55 abuts the plate 37 at 57.

As is apparent in FIGS. 2 and 3 the inner tubular element is further formed with a contiguous nozzle housing 58 in the usual and customary manner.

Thus it is apparent that the thermal expansion assemblies 31 and 32 provide axially resilient or spring-like structures whose tubular portions respond (expand) to heat conveyed from the relatively hot manifold to support, clamp and seal the floating manifold between mold plates while thermally insulating the mold cavity in a much more efficient manner than has been possible heretofore.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In a pressure molding machine having a floating manifold disposed between two spaced abutments, said manifold having at least one conduit communicating with and contacting a nozzle set in one of said abutments, means for sealing the manifold relative to said nozzle comprising:

thermal expansion manifold support assemblies disposed between the manifold and mating abutments, each thermal expansion assembly having a first expansion element in contact with said manifold and spaced from an adjacent abutment, and a second thermal expansion element in contact with a mating abutment, and spaced from said manifold, said second expansion element being a tubular body having a first flange extending radially outwardly from one end thereof and a second flange extending radially inwardly from an opposite end thereof, said first flange contacting said adjacent abutment at a first region of contact, said first expansion element having a pair of opposite ends and being seated in the second expansion element with one end of the first element contacting the second flange at a second region of contact, and an opposite end of the first element being free of contact with said second expansion element, said opposite end of the first element being in contact with the manifold, whereby compressive stress in said elements resulting from thermal expansion is distributed to both elements thereby precluding the tendency of said elements to buckle or collapse under stress while minimizing the transfer of heat to said abutments.

2. The molding machine of claim 1 in which said expansion elements each have a tubular body.

3. The molding machine of claim 2 in which the tubular bodies in each assembly are disposed in a telescoping relationship.

4. The molding machine of claim 3 in which the tubular bodies of the expansion elements in each assembly are spaced radially by a first annular insulating air space which is co-extensive with said tubular bodies.

5. The molding machine of claim 3 in which said second expansion element is recessed in a well formed in an abutment and a substantial portion of the tubular body of the second element is spaced radially from said abutment to define a second annular insulating air space.

6. The molding machine of claim 3 in which the respective expansion elements are formed with peripheral bearing surfaces for maintaining alignment.

7. The molding machine of claim 6 in which the peripheral bearing surface of the first expansion element is in snug contact with an interior wall of said second expansion element in the second region of contact with the second flange of said second element.

8. The molding machine of claim 7 in which the peripheral bearing surface of the second expansion element is in snug contact with the well in the first region of contact with the first flange of said second element.

9. The molding machine of claim 5 in which the first expansion element includes a nozzle housing spaced radially from the tubular wall of said first element to define a third annular insulating air space.

10. The molding machine of claim 2 in which the tubular body of the first expansion element has a wall thickness substantially the same as a corresponding wall thickness of the second expansion element.

* * * * *